March 6, 1928.
K. BROWN
GAUGE FOR LIQUIDS
Filed Oct. 28, 1924
1,661,995
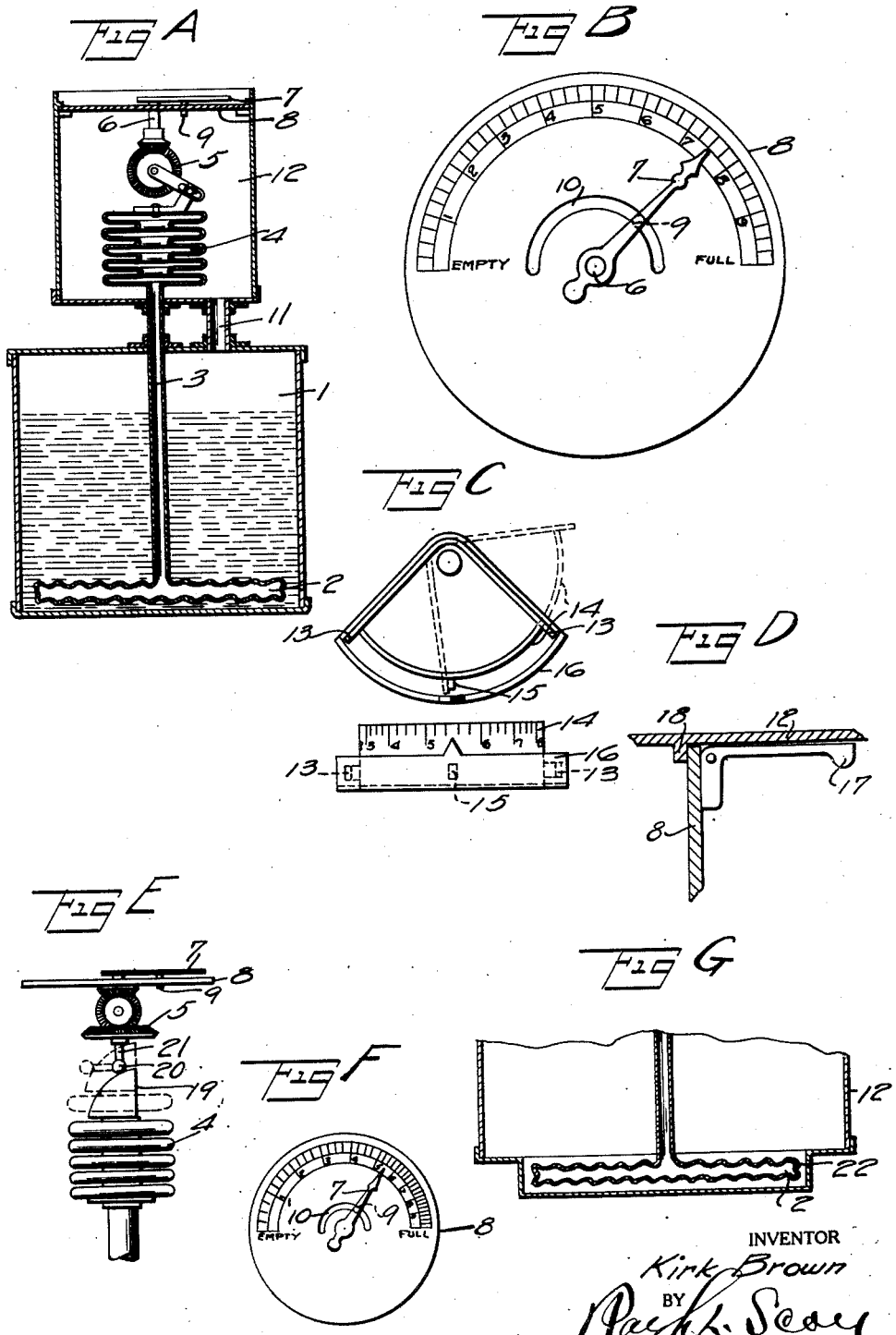
INVENTOR
Kirk Brown
BY
ATTORNEY Patented Mar. 6, 1928.

1,661,995

UNITED STATES PATENT OFFICE.

KIRK BROWN, OF MONTCLAIR, NEW JERSEY.

GAUGE FOR LIQUIDS.

Application filed October 28, 1924. Serial No. 746,275.

This invention relates to pneumatic systems for showing the quantity or head of a given body of liquid in a tank or the like.

In part the invention comprises a system wherein a primary sensitive member is compressed by an increase in depth of the liquid to be measured, said member being in pneumatic communication with a secondary sensitive member which is expanded by the air or other gas confined in the system, the motion thus imparted to the secondary member being employed to actuate an indicating device.

Self-contained enclosed systems of the kind herein described, where the air or other gas with which they are filled is not subjected to the presence of the liquid to be gauged, are superior to those in which the air is subjected to that presence; as, in the latter case, the alternate vaporization and condensation of the liquid, with which the air may become saturated, affects the accuracy of the gauge.

But even in the self-contained enclosed systems, temperatures constantly changing from what may be termed normal, effect a variation in the density of the confined gas, which variation is reflected in the pressure exerted thereby, thus rendering the gauge reading not only inaccurate but frequently actually misleading. For example, at normal temperature a given tank is shown by the gauge to be not full; a marked rise in temperature causes expansion of the confined gas, a greater pressure is exerted on the indicator-actuating member, and the gauge is made to show the tank is full; again, when the tank is actually full, a drop in temperature causes a condensation of the gas, a less pressure is exerted, and the gauge indicates it is not full.

The present invention has for its prime object the production of a gauge having means to compensate for changes in temperature whereby accuracy of indication is obtained. The inventive idea involved is capable of receiving a variety of mechanical expressions, preferred forms being shown in the accompanying drawings for the purpose of illustration.

In the drawings, where the same reference numeral is used in all views to indicate the same or like parts, Fig. A is a vertical cross-section of a tank containing liquid and the gauge for measuring same;

Fig. B is a plan view of an indicating dial with device for compensating for changes in atmospheric temperature;

Fig. C is a plan and elevation of a sector indicator, an alternative construction to that shown in Fig. B;

Fig. D is a detail of the mounting of the dial shown in Figs. A and B;

Fig. E is another form of the indicating mechanism shown in Fig. A;

Fig. F is a top plan view of Fig. E; and

Fig. G is a sectional view of a sump or well in the tank.

In the drawings is shown a tank 1 containing liquid to be measured. At or near the bottom thereof is a primary sensitive member 2 of any desired type of compressible and expansible hollow diaphragm. A secondary sensitive member 4, of similar but not necessarily like construction, is housed within the casing 12 located at any convenient point. These two sensitive members are inter-connected as by a capillary 3. The parts 2, 3 and 4 are filled with air or other gas and closed to prevent the escape thereof and also to exclude the surrounding liquid or atmosphere.

A train of suitable gears such as 5 is provided to translate any line movement of the member 4 to a rotary shaft 6, which freely passes through a central aperture in the dial 8, and on the outer end of which is mounted a hand or indicator 7 to swing in front of the dial. A pin 9 projects from the hand 7 and engages with the arcuate slot 10 in the dial, for the purpose hereinafter described.

A tube 11 connects the interior of tank 1 above the liquid level with the interior of casing 12 enclosing the indicating mechanism.

The operation of the device is as follows: The weight of the liquid in tank 1 compresses the member 2 more or less as the quantity or height of the liquid varies. As 2 is compressed the gas within it is expelled through capillary 3 into member 4, which latter is correspondingly expanded.

The pressure exerted by a small quantity of liquid is very slight; but it is sometimes important to indicate such small quantities, as in the case of automobile fuel tanks where the chief use of an indicating gauge of this character is to enable the driver to estimate the distance he can travel on his ever diminishing supply of fuel, or to warn him of the necessity of replenishing. The secondary sensitive member 4 is, therefore, preferably made smaller in diameter than the primary sensitive member 2. As the compression of 2 and the expansion of 4 are longitudinal only, the relative motions will be directly as the squares of their diameter. Thus if the diameter of 2 is two inches and the diameter of 4 is one-fourth inch, the upward or expanding movement of 4 will be sixty-four times the downward or compressing movement of 2. This greater movement of 4 makes readily discernible the less movement of 2 resulting from the pressure of small quantities of liquid, and this without the frictional resistance that would be incurred by using the usual means of gears and levers for multiplying the movement, thus permitting the use of the slight and delicate parts necessary in a sensitive gauge for measuring small quantities.

For some uses of the gauge, such as measuring considerable depths of liquid, the secondary sensitive member 4 may be as large or even larger than the primary 2.

Any movement of the secondary member 4 is translated through the gears 5 to the rotary shaft 6, on the outer end of which is mounted the hand 7, thereby causing the hand to be moved in accordance with the degree of expansion or contraction of said member.

The dial 8 is so positioned that under normal or the usual conditions encountered in the use of the gauge, if the tank be full the hand will so indicate on the dial, and if it be only partly full or empty the hand will likewise give a correct indication. In its travel from the "full" to the "empty" positions, or vice versa, the hand will cover a certain fixed arc, of say 180° The slot 10 in the dial is an arc of a like number of degrees, the respective ends of the slot being on a radial line extending from the axis of the shaft 6 to the markings "full" and "empty" on the dial. With such construction, and under the stated normal temperature conditions, when the hand 7 denotes the tank is empty the pin 9 will be positioned at one end of the slot, and at the other end thereof when the tank is full.

The dial is mounted in any manner suitable for the purpose herein described. It is normally stationary, and is preferably held in position by frictional engagement. This may be accomplished in a variety of ways, as for instance as shown in Fig. D where 8 is a vertical cross-section of the dial upon the surface of which friction of any desired degree is exerted by a weighted bell crank 17 which presses the dial against a stop 18. The dial is provided with suitable graduations to indicate either depth or volume; and, when used in connection with the gasoline tank of an automobile, for example, it may also well have the markings "empty" and "full".

Any drop in temperature below that usually encountered, and for which the dial is ordinarily positioned, will effect a condensation of the confined gas in the system (comprising the members 2, 3 and 4) and a resultant decrease in pressure on the secondary member 4, even though the amount of liquid in the tank remain constant. With such temperature drop, if the tank be empty the compression of the secondary member would retract the hand 7 below its normal "empty" position; and if the tank be full, the hand 7 will likewise be retracted from its normal "full" position, as the expansion of the secondary member will be insufficient to cause it to travel to that position; and at any intermediate position of the hand it would also indicate a less amount of liquid than justified by the actual contents of the tank. And any rise in temperature above that for which the dial is ordinarily positioned will effect any expansion of the confined gas, with a resultant increase in pressure on the secondary member, and the hand will be advanced to indicate an amount of liquid in excess of the actual contents of the tank.

This variation in indication, due to changes in temperature, is compensated for in the present invention by the manner in which the normally stationary dial or other scale is adjusted to position by the movable hand, so that the relative positioning of the two members results in a corrected reading.

More specifically, when a fall in temperature is sufficient to effect condensation of the confined gas, and thereby retract the hand 7 below its normal "empty" position, the projection 9 on the hand impinges against the end of the slot 10 and revolves the dial in the direction of travel of the hand, thus adjusting the dial to a new position coinciding with the then normal swing of the hand under such temperature, the pull of the secondary member when contracted under such conditions being sufficient to overcome the slight frictional engagement of the dial and to rotate it upon its axis.

When an increase of temperature above normal, or above any other temperature at which the device is working, is sufficient to effect an expansion of the confined gas, and thereby advance the hand beyond its normal "full" position, the tank being full, the projection 9 on the hand impinges against the opposite end of the slot, and in like manner adjusts the dial to position for the higher temperature.

This rectification for temperature is entirely automatic; every time the tank is emptied the indicator is corrected for any decrease of temperature that has taken place since it was previously empty, and every time the tank is filled it is corrected for any increase of temperature. While this is not an absolute correction for all positions of the hand, it is for the "empty" and "full" positions; and while no considerable changes in temperature are taking place the indicator will read correctly for all intermediate positions. For many purposes this is sufficient, as in an automobile fuel gauge where the "empty" and "full" indications are chiefly used.

Instead of the dial 8 and hand 7 other indicating means can be used where the normally stationary member can be moved to and fro by the movable member. Such an alternative construction is shown in Fig. C, where the moving member is the sector of a drum 14 carrying projections 13 which engage with projection 15 on the normally stationary member the sector of another drum 16.

It is sometimes advantageous to indicate the smaller quantities in the tank more clearly than the larger quantities in order that depletion can be closely watched. A method of doing this is shown in Fig. E where the secondary sensitive member carries on its movable end a cam 19 which bears against the rocker arm 20 which by means of the shaft 21 revolves the train of gears 5 and the pointer 7; the cam and rocker arm are shown in the full thrown position by dotted lines. This cam is so shaped that with each increment of its travel the rocker arm travels through a decreasing space, in consequence of which the pointer 7 will indicate a unit of measurement by a larger sector at the beginning than at the end so that sub-divisions of this unit can be easily observed, as shown in Fig. F.

If the construction shown in Fig. E be positioned horizontally, the arm 20 will at all times be kept in contact with the cam 19 by gravity; if it be positioned vertically, contact may be maintained as by a suitable coiled spring on the shaft 21.

The primary sensitive member 2 is preferably very thin, in order that it may be submerged in as little depth of liquid as possible so that the gauge will record correspondingly. This sensitiveness to small quantities can be further bettered by placing the primary member in a sump or well 22, as shown in Fig. G.

Both the sensitive members 2 and 4 may be constructed like the corrugated discs used in aneroid barometers, the bellows commonly used in domestic steam heaters, or the Bourdon tubes used in pressure gauges, all of which are widely known, but the present invention is not limited to these particular forms, as others that would function in like manner may be used.

When any pressure other than the usual atmospheric is exerted upon the surface of the liquid to be measured, the space above the liquid and the interior of the casing 12 should be in communication, in order that such pressure may be equally applied to the exterior of the secondary member that it may be affected interiorly only by the pressure of the liquid on the primary member. Such a communication is shown by tube 11 in Fig. A. Preferably this tube is of sufficient interior diameter to permit the return of any condensed vapor that may form in the casing 12.

For the purpose of illustration only, the drawings show the indicator as above and close to the tank containing the liquid to be measured, but obviously it may be placed in any position relative to that of the liquid, as on the instrument board of an automobile where the gasoline tank is in the rear; and the gauge may be used for measuring the depth of lakes, streams and other bodies of liquid, as well as tanks.

While I have, for the purpose of disclosing the invention, described and shown it with much particularity, nevertheless it is not limited to the precise dimensions, materials or arrangement of parts shown, since these may be varied within the terms of the appended claims without departing from the spirit of the invention.

The following is claimed:

1. In a liquid gauge, a closed gas-containing member comprising a compressible chamber adapted to be positioned in the body to be measured and responsive to variations in the pressure thereof, an expansible chamber adapted to be positioned exterior to said body, and a connection between said two chambers, in combination with a movable pointer, means operable by said expansible chamber to actuate said pointer, a scale co-operating with said pointer and remaining in fixed position while the pointer travels between limits indicating the minimum and maximum of the liquid to be measured, and means intermediate the pointer and scale whereby the scale is repositioned when the pointer reaches either of said limits and continues its movement due to change in temperature.

2. In a gauge for liquids, an indicating member movable by changes in volume of the liquid to be measured and also by changes in the temperature, means for actuating the same by the static pressure of the liquid to be measured, a scale co-operating with said indicating member and means for moving said scale by the indicating member when said member reaches either terminal of the scale and then continues its movement because of change in temperature since the previous adjustment.

3. In a liquid measuring device, an indicating member movable with changes in the quantity of liquid to be measured and movable also with changes in temperature, a co-operating scale member, means for actuating the indicating member, and means for moving the scale member by the indicating member when a change in temperature takes place and when during such change the indicating member continues its movement after reaching either the maximum or minimum terminal of the scale, whereby the position of the two members with respect to each other is corrected for the change in temperature.

4. In a gauge for liquids, a movable indicator having a zone of travel which varies with changes in temperature, means responsive to the static pressure of the head of the liquid being measured for moving said indicator, a scale member, and means operable by said indicator when it passes beyond either extreme of its preceding zone of travel due to change in temperature for correcting the position of said scale to compensate for such change.

5. In a gauge for liquids, a movable indicator having limits of travel variable with changes in temperature, liquid pressure operated means for actuating the same, a scale member co-operating with said indicator, and means carried by said indicator for moving said scale when because of a temperature change the indicator passes its preceding limit of travel in either direction, whereby the scale and indicator are relatively positioned to give a correct reading under the then prevailing temperature.

6. In a pneumatic gauge for liquids, an indicator member, a scale member co-operating therewith, means responsive to the pressure of the liquid being gauged for actuating one of said members, and means for adjusting the position of said members with respect to each other to compensate for changes in temperature when said actuated member travels beyond either extreme of its movement at a preceding temperature.

7. In a gauge for liquids, an indicator actuated by the static pressure of the liquid to be measured and having a definite zone of travel at a given temperature, a scale co-operating with said indicator and normally positioned to give a correct reading at said temperature, and means operable by the indicator for re-positioning the scale to correspond with changes in location of said zone due to changes in temperature whenever the indicator travels beyond either terminal of its normal zone.

8. In a gauge for liquids, two relatively movable members, one of said members having a definite zone of travel at a given temperature and being adapted to be actuated by the static pressure of the liquid to be measured, and means for moving the other of said members by the actuated member when due to a change in temperature said actuated member travels beyond either terminal of its normal zone.

In testimony whereof, I have signed my name to this specification.

KIRK BROWN.